United States Patent [19]

Meynier

[11] 4,453,452

[45] Jun. 12, 1984

[54] SERVOMOTOR FOR BRAKING ASSISTANCE WITH REDUCED STROKE OF ACTUATION

[75] Inventor: Guy Meynier, Bondy, France

[73] Assignee: Societe Anonyme DBA, Paris, France

[21] Appl. No.: 345,498

[22] Filed: Feb. 3, 1982

[30] Foreign Application Priority Data

Feb. 19, 1981 [FR] France ................... 81 03270

[51] Int. Cl.³ .................................................... F15B 9/10
[52] U.S. Cl. ................................. 91/376 R; 91/369 A
[58] Field of Search ............ 91/369 A, 369 B, 369 R, 91/376 R; 60/547.1

[56] References Cited

U.S. PATENT DOCUMENTS

| | | | |
|---|---|---|---|
| 3,434,388 | 3/1969 | Julow | 91/6 |
| 4,282,799 | 8/1981 | Takeuchi | 91/369 A |
| 4,358,990 | 11/1982 | Takeuchi | 91/369 A |

FOREIGN PATENT DOCUMENTS

| | | |
|---|---|---|
| 2461200 | 7/1975 | Fed. Rep. of Germany . |
| 1420988 | 11/1965 | France . |
| 1562332 | 2/1969 | France . |
| 1161142 | 8/1969 | United Kingdom . |
| 2036221 | 6/1980 | United Kingdom . |
| 2065809 | 6/1981 | United Kingdom ............. 91/369 A |
| 2068067 | 8/1981 | United Kingdom ............. 91/369 A |

*Primary Examiner*—Paul E. Maslousky
*Attorney, Agent, or Firm*—Larry J. Paiguta; Paul D. Schoenle; K. C. Decker

[57] ABSTRACT

Servomotor with reduced idle stroke of actuation without decrease in valve lift on release of the brake.

According to the invention, the rest position of the actuating rod 36 is determined by movable stop 60 capable of withdrawing on release of the brake in order not to impede lift of the valve poppet 32 relative to the seat 40, which allows, in the rest position, these two elements to be brought closer with a short distance d, thus reducing the idle stroke of actuation.

Application to power-assisted braking.

5 Claims, 2 Drawing Figures

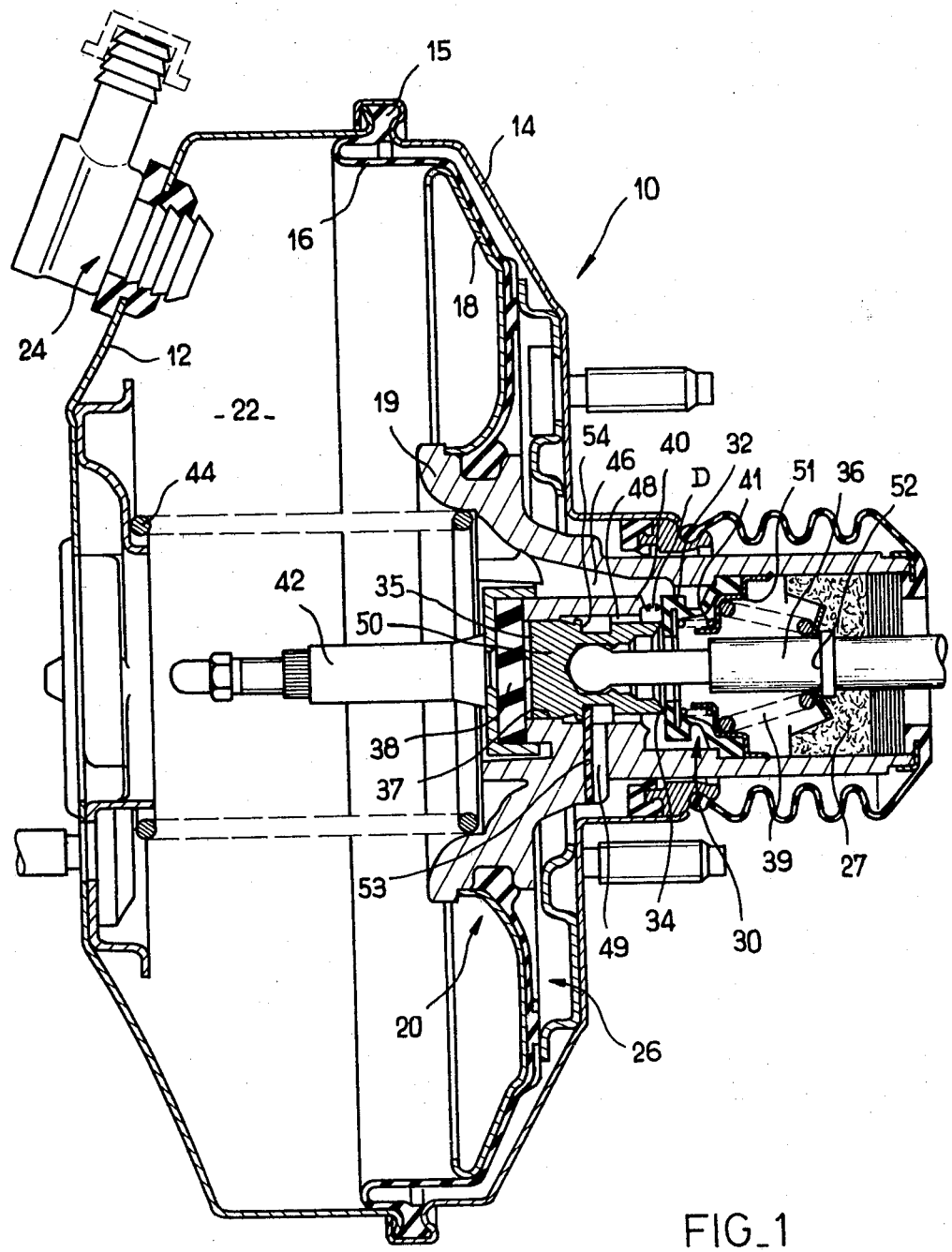
FIG_1

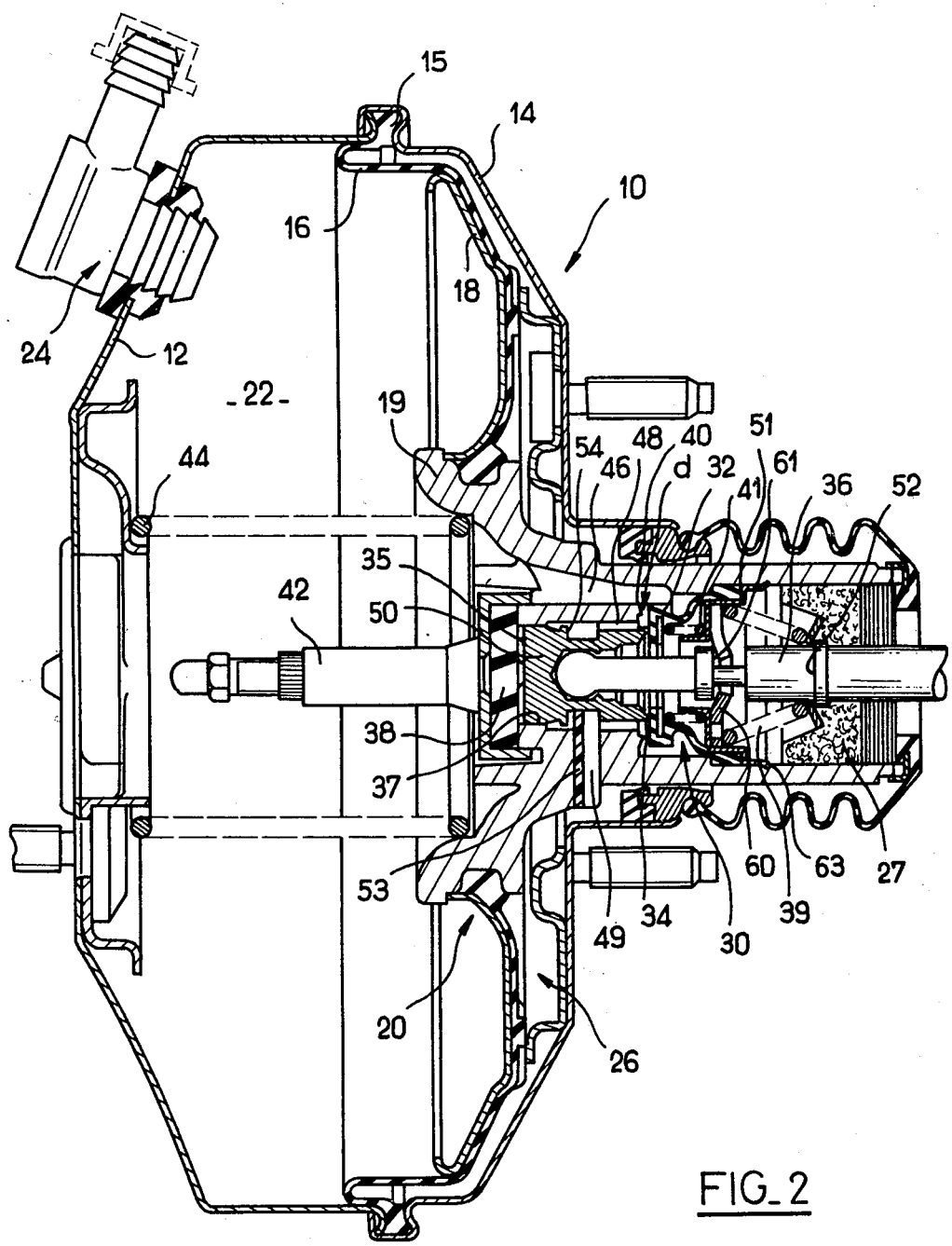
FIG_2

SERVOMOTOR FOR BRAKING ASSISTANCE WITH REDUCED STROKE OF ACTUATION

The invention concerns a servomotor for braking assistance with reduced idle stroke of actuation and more particularly an improvement in the actuating mechanism of this servomotor allowing such a reduction in idle stroke to be obtained without decreasing the valve lift on release of the brake.

In a conventional servomotor for braking assistance, including two chambers separated from each other by a driving piston capable of actuating a brake master cylinder by displacement from a rest position, the driving piston comprises a three-way valve-forming mechanism actuated by an axial push rod connected to the brake pedal. One of the chambers is provided for connection to a vacuum source available on the vehicle (for example the vacuum in the intake manifold of the engine) and the role of the three-way valve consists in putting the other chamber in communication with the vacuum chamber or with the atmosphere. The valve is essentially composed of a movable annular valve poppet capable of coming alternately into abutment on the one hand against a movable seat integral with the push rod and on the other hand against an annular seat defined in the driving piston around the movable seat, the latter being constructed at one end of a plug mounted slidingly within the driving piston. In the rest position of the valve-forming device, the movable annular valve poppet is in abutment against the movable seat and this position establishes communication between the two above-mentioned chambers. On the other hand, axial displacement of the push rod induces retraction of the movable seat and the annular valve poppet then becomes engaged against the annular seat, which has the effect of cutting off the two chambers from each other and of putting in communication with the atmosphere the one which is not directly connected to the vacuum source; which induces displacement of the driving piston and actuation of the brake master cylinder.

The rest position of the device is normally defined by mechanical contact of the sliding plug on which is defined the movable seat against a stop called a "locking key" integral with the driving piston. Axial sliding of the plug relative to the driving piston is limited over a certain axial distance calculated to guarantee an appropriate lift of the movable valve poppet on release of the pedal, ensuring good passage of air. This structure functions satisfactorily but imposes a relatively great idle stroke on the application of braking, which is represented by the axial distance separating the movable valve poppet from the annular seat, in the rest position of the system. The reduction of this idle stroke is a current preoccupation of engineers, notably by reason of the fact that it is multiplied by the ratio of the brake pedal and that, consequently, the least gain at the level of this idle stroke may be manifested by a notable gain in space in the occupants' compartment of the automobile. The invention answers this preoccupation while maintaining a suitable valve lift for good operation of the three-way valve-forming assembly.

More precisely, the invention therefore concerns a servomotor for braking assistance of the vacuum type including a first chamber provided for connection to a vacuum source, a second chamber separated from the first by a driving piston capable by displacement from a rest position of actuating a brake master cylinder, said driving piston comprising a three-way valve actuated by a push rod for putting said second chamber in communication with said first chamber or with the atmosphere, which valve comprises a movable annular valve poppet capable of coming alternately into abutment on the one hand against a movable seat integral with said push rod and on the other hand against an annular seat defined in said driving piston around said movable seat, said movable seat being constructed at one end of a plug mounted axially slidingly within said driving piston while said valve poppet is in abutment against said movable seat in the rest position of the servomotor, characterized in that it comprises a movable stop extending approximately perpendicularly to the axis of said rod, maintained by a resilient element against a support which is fixed relative to said driving piston, in said rest position, and in that said stop cooperates with a shoulder of said actuating rod to maintain said movable valve poppet at a short distance from said annular seat, thereby reducing the idle stroke of actuation of the servomotor.

On the other hand, on release of the pedal, the movable stop will be able to withdraw axially against the force of said resilient element and will not therefore be able to constitute an obstacle to lift of the movable valve poppet. With such an arrangement, the rest position of the valve components will no longer be defined by contact between a shoulder of the plug and the locking key.

The invention will be understood better and further advantages thereof will appear better in the light of the description which will follow of two servomotors for braking assistance, given with reference to the attached drawings in which:

FIG. 1 is a schematic view in section of a conventional servomotor for braking assistance; and FIG. 2 is a similar view of a servomotor for braking assistance according to the invention.

Referring to FIG. 1, the conventional servomotor for braking assistance, as shown, comprises a housing 10 formed of two shells 12 and 14 assembled at their periphery so as to enclose the external flange 15 of a flexible diaphragm 16 constituting, in association with a rigid plate 18 and a central body 19, a driving piston assembly 20. The assembly edges of the shells 12 and 14 are shaped to be assembled by crimping, holding the flange 15 captive. In this way, the driving piston 20 separates the housing 10 into two chambers, respectively a first chamber or low pressure chamber 22 designed for permanent connection to a vacuum source via a connecting adapter 24 and a second chamber or high pressure chamber 26 capable of being put in communication either with the chamber 22 or with the atmosphere, the latter via a filter 27. The central body 19 extends rearwards, that is, in the direction of the actuating members of the servomotor, so as to accommodate a device forming a control valve 30, of the three-way type. The latter consists essentially of a movable annular valve poppet 32, made of rubber, capable of coming alternately into abutment on the one hand against a movable seat 34 integral with an input push rod 36, connected to the brake actuating pedal (not shown) and, on the other hand, against an annular seat 40 defined in the central body 19 around the movable seat 34. The central body 19 comprises an axial bore 37 constituting a sliding bearing for a plug 50 at the end of which is constructed the movable seat 34. The sliding plug 50, articulated by a ball joint on the rod 36, ends in a stop surface 35 capable of becoming engaged with a reaction device 38 composed of a rubber washer. The opposite face of the reaction device 38 cooperates with a push rod 42 which is capable of setting in operation the drive of a brake master cylinder (not shown). A spring 44 is supported on the reinforcing piece of the shell 12 and urges the driving piston 20, in its rest position as shown in the drawing, against the shell 14. When the servomotor is in this rest position, the movable valve poppet 32 is disengaged from the annular seat 40 so as to allow the two chambers 22 and 26 to communicate via passages such as 46, 48 and 49, through the body 19. More precisely, the passages 46 allow fluid communication between the chamber 22 and the opening of the annular seat 40 while the passages 48 and 49 allow fluid communication between the second chamber 26 and the opening of the annular seat 40. Thus, when the servomotor is in its rest position as shown, the two chambers 22 and 26 communicate effectively and the same level of partial pressure prevails in these two chambers, since the valve poppet 32 which controls communication with the atmosphere via the filter 27 as in sealing tight abutment against the seat 34 by the action of the pressure difference and springs such as 39 and 41. The spring 39 is mounted under compression between a support collar 51 and a first shoulder 52 of the push rod 36 so that the movable seat 34 is normally urged in the direction of the annular valve poppet 32. The spring 41 is mounted under compression between the support collar 51 and the movable valve poppet 32 to urge it in the direction of the coaxial seats 34 and 40. The support collar 51 is itself in abutment against an annular base of the valve poppet 32, integral with the central body 19. Axial sliding of the plug 50 within the bore 37 is limited over a certain axial distance by cooperation of an annular groove 54, of predetermined width, made in the surface of the plug 50, and a locking key 53, integral with the central body 19. Contact between one of the ends of the groove 54 and the key 53 determines the rest position of the valve mechanism, which is therefore provided, by construction, with an idle stroke of acutation D represented by the axial distance between the seat 40 and the movable valve poppet 32. The value of this idle stroke D corresponds to the valve lift necessary, at the end of a braking stage, to ensure a suitable response time of the servomotor, for return to the rest position.

FIG. 2 shows the improvement according to the invention adapted to the conventional servomotor which has just been described. Consequently, the unmodified constituent parts of this servomotor bear the same reference figures and will not be described a second time. The valve mechanism is completed by a movable stop 60 extending approximately perpendicular to the axis of the push rod 36 and maintained by a resilient element, consisting of the spring 39, against the support collar 51. The stop 60 cooperates with a second shoulder 61 of the actuating rod 36 to define a new rest position of the constituent parts of the three-way valve 30. The position of the shoulder 61 is therefore selected to maintain the valve poppet 32 at a short distance d from the annular seat 40, via the rest position of the movable seat 34. In this new rest position with reduced idle stroke, the relative positions of the different elements of the valve are therefore no longer determined by cooperation of the annular groove 54 and the key 53. On the contrary, as can be seen clearly in FIG. 2, the edges of the groove 54 are maintained removed from the key 53 by positioning of the push rod (and of the plug 50) imposed by the movable stop 60. The role of the key 53 is therefore confined to fixing the limits of maximum stroke of the plug 50 within the bore 37 and the maximum value of valve lift on release of the brake. It is to be noted that the support collar 51 advantageously comprises at its radially outermost perimeter clip lugs 63 improving its fixing within the central body 19. In the example described, the movable stop advantageously has the form of a washer, apertured to allow the passage of air between the filter 27 and the chamber 26 and shaped with an approximately spherical profile in its central portion. This last detail allows angular deflection of the push rod around its ball joint connecting it to the plug 50, the shoulder 61 being supported within this spherical portion. The shoulder 61 may be constructed by one of the ends of an annular groove made in the push rod 36 and of which the width is sufficient not to impede actuating movement of the rod.

The servomotor for braking assistance according to the invention operates in the following manner. In the absence of braking, the situation is as illustrated in FIG. 2, the chambers 22 and 26 are in communication and connected to the intake manifold. A low pressure therefore prevails in these two chambers. When the driver actuates the brake pedal and therefore the push rod 36, the plug 50 is driven back within the bore 37 so that after a relatively short idle stroke d, the chamber 26 is cut off from the chamber 22. Additional thrusting of the plug 50 puts the chamber 26 in communication with the atmosphere since the valve poppet 32 becomes separated from the movable seat 34. From this moment, the driving piston assembly 20 is displaced from right to left, considering FIG. 2, and actuates the master cylinder. On release of braking, the response time of the servomotor, that is, the time necessary for the driving piston to return to its rest position, depends notably on the lift of the valve poppet 32 relative to the annular seat 40. This may be as great as in a conventional servomotor, due to a slight withdrawal of the stop 60, caused by the return movement of the push rod 36. The return of the latter is due partly to the action of the pedal return spring and above all to the thrust applied to the rod 42 by hydraulic reaction of the master cylinder, transmitted through the reaction disc. In this phase, the spring 41 is compressed to allow increasing of the valve lift. At rest this spring returns to its initial position and the clearance "d" reappears between seat and valve poppet, hence a short idle stroke at the following application. The stop 60 returns rapidly into abutment on the collar 51 by the action of the spring 39.

Naturally, the invention is not limited to the embodiment which has just been described but includes all technical equivalents of the means involved if these are within the scope of the claims which follow.

I claim:

1. Servomotor for braking assistance, of a vacuum type, including a first chamber (22) intended to be connected to a vacuum source, a second chamber (26) separated from the first chamber by a driving piston (20) connected to an output member, said driving piston comprising a distribution valve (30) actuable by an input push rod (36) to selectively put said second chamber in communication with said first chamber or with the atmosphere, said valve comprising a movable annular valve poppet (32) resiliently axially biased and capable of coming alternately into sealing abutment against a movable seat (34) integral with said push rod and against an annular seat (40) defined in said driving piston around said movable seat, said movable seat being constructed at one end of a plug (50) mounted axially slidingly within said driving piston, said valve poppet being in abutment against said movable seat and spaced apart from said annular seat in the rest position of the servomotor, characterized in that it comprises a movable stop (60) extending approximately perpendicularly to the axis of said rod and resiliently axially biased so as to normally bear in abutment against a bearing surface (51) which is fixed relative to the driving piston, in said rest position, and in that said stop cooperates with an abutment surface (61) of said push rod to maintain in said rest position said movable valve poppet at a short distance (d) from said annular seat, thereby reducing the idle stroke of actuation of the servomotor.

2. Servomotor for braking assistance according to claim 1, characterized in said movable seat (34) being biased in the direction towards said annular valve poppet (32) by at least one compression spring (39) interposed between a fixed support member (51) which forms the bearing surface of the driving piston and a first shoulder (52) of said push rod, said movable stop biased by said spring (39) against said fixed support member (51) forming said bearing surface, said abutment surface of said push rod being formed by a second shoulder (61) of said push rod and facing said first shoulder thereof.

3. Servomotor for braking assistance according to claim 2, of the type in which axial sliding of said plug (50) relative to said driving piston is limited over a certain axial distance by cooperation of a groove (54) of predetermined width and a locking key (53) belonging respectively to each of these two elements, characterized in that, in said rest position, the facing edges of said groove are maintained spaced from said key by positioning of said push rod (36) imposed by said movable stop (60).

4. Servomotor for braking assistance according to claim 1, characterized in that said stop (60) is formed by an apertured washer for allowing the passage of air.

5. Servomotor for braking assistance according to claim 4, characterized in that said washer has an approximately spherical profile at least in a central portion thereof.

* * * * *